Patented Mar. 11, 1930

1,750,228

UNITED STATES PATENT OFFICE

GEORG KRÄNZLEIN, OF FRANKFORT-ON-THE-MAIN-HOCHST, ERICH KRONHOLZ, OF BAD-SODEN-ON-THE-TAUNUS, AND FRITZ RÖMER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

ACID WOOL DYESTUFFS OF THE ANTHRAQUINONE SERIES

No Drawing. Application filed July 21, 1928, Serial No. 294,565, and in Germany December 14, 1926.

Our present invention relates to acid wool dyestuffs.

More particularly it relates to the dyestuffs of the general formula:

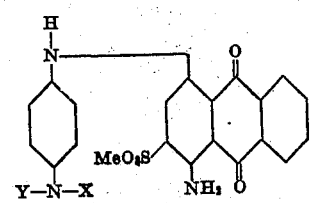

wherein X represents alkyl or aralkyl, Y an aliphatic acyl residue, and Me metal or hydrogen.

These compounds are obtainable by causing a 1-amino-4-halogen-anthraquinone-2-sulfonic acid compound to react in an aqueous medium and in the presence of a copper catalyst, such as a copper or a copper compound, particularly a copper salt, with a compound of the general formula:

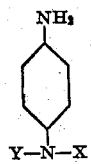

wherein X represents alkyl or aralkyl and Y stands for an aliphatic acyl residue.

Our new dyestuffs surpass as to their leveling properties even the well known dyestuff which is obtainable by causing 1-amino-4-bromanthraquinone-2-sulfonic acid to react with para-aminoacetanilide.

The following examples illustrate our invention, but they are not intended to limit it thereto, the parts being parts by weight;

1. 10 parts of sodium 1-amino-4-bromanthraquinone-2-sulfonate, 7 parts of 4-amino-1-methylacetanilide, 7 parts of sodium bicarbonate and 0,5 parts of copper sulfate in 80 parts of water are kept in the water-bath at 60° C. to 80° C. until the formation of the dyestuff is complete, which is usually the case after 2 to 3 hours. The dyestuff is salted out with sodium chloride, or potassium chloride, filtered and, if required, purified by redissolving. It constitutes laminæ of a bronze luster dissolving in water to a blue solution. The dyestuff has the formula:

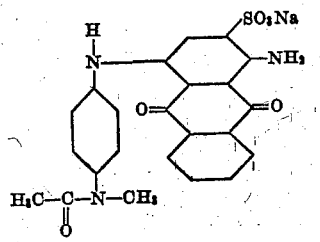

It dyes wool blue tints and is easily soluble in water. It has excellent properties as to fastness to light and possesses a great leveling power.

2. 20 parts of 1-amino-4-bromanthraquinone-2-sulfonic acid, 22 parts of sodium bicarbonate, 10 parts of 4-amino-1-methylformanilide, 1 part of copper sulfate and 750 parts of water are mixed together, while stirring, so as to become a homogeneous mass, and the mixture is heated for 10 hours to 60° C. to 70° C., condensation taking place. As soon as the condensation is complete, the mass is diluted with 750 parts of hot water, filtered so as to eliminate the copper mud and the dyestuff is salted out from the solution by means of 150 parts of sodium chloride.

The dyestuff is purified by dissolving it in hot water and reprecipitating it with sodium chloride. The dyestuff has the formula:

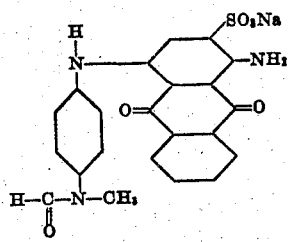

It dyes wool blue tints and is easily soluble in water. It has excellent properties as to fastness to light and possesses a great leveling power.

In the preceding examples there may be used instead of para-aminomethylacetanilide and para-aminomethylformanilide respectively a compound of the type formula

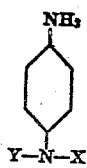

wherein Y stands for an aliphatic acid residue, X represents a substituent of the group consisting of ethyl, benzyl and their homologues. Such compounds are, for instance, para-aminoethylacetanilide, para-aminoethylformanilide, para-aminobenzyl-acetanilide and para-aminobenzylformanilide.

This application contains subject matter in common with our co-pending U. S. patent application Ser. No. 238,990 filed December 9, 1927.

By the expression "inorganic substance of a feebly alkaline reaction" occurring in the appended claims, we mean any inorganic substance corresponding to sodium bicarbonate in alkalinity.

We claim:

1. As new products, the dystuffs of the following constitution:

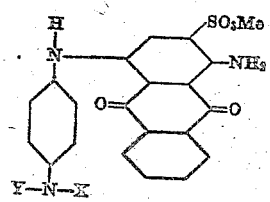

wherein X stands for an alkyl or aralkyl group, Y for an aliphatic acyl residue and Me for a metal or for hydrogen dyeing wool blue tints, being easily soluble in water, having excellent properties as to fastness to light and possessing a great leveling power.

2. As new products, the dyestuffs of the following constitution:

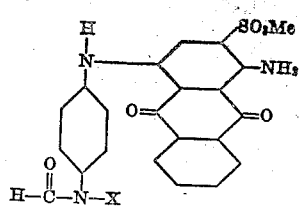

wherein X stands for an alkyl or aralkyl group and Me for a metal or for hydrogen dyeing wool blue tints, being easily soluble in water, having excellent properties as to fastness to light and possessing a great leveling power.

3. As a new product, the dyestuff of the following composition:

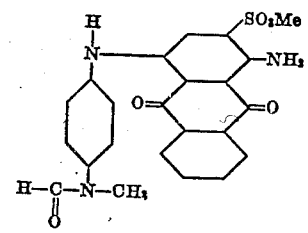

dyeing wool blue tints, being easily soluble in water, having excellent properties as to fastness to light and possessing a great leveling power.

In testimony whereof, we affix our signatures.

GEORG KRÄNZLEIN.
ERICH KRONHOLZ.
FRITZ RÖMER.